United States Patent [19]

Marder et al.

[11] Patent Number: 5,679,016
[45] Date of Patent: Oct. 21, 1997

[54] APPARATUS FOR SELECTING FIXTURE CONDUCTORS AND METHOD FOR RAPIDLY WIRING SAID FIXTURES

[75] Inventors: William Wade Marder, Lithonia; Ormand Gilbert Anderson, Jr., Canton, both of Ga.

[73] Assignee: NSI Enterprises, Inc., Atlanta, Ga.

[21] Appl. No.: 602,358

[22] Filed: Feb. 16, 1996

Related U.S. Application Data

[63] Continuation of Ser. No. 198,840, Feb. 18, 1994, abandoned.

[51] Int. Cl.$^6$ ............................................. H01R 29/00
[52] U.S. Cl. ...................... 439/171; 439/731; 439/269.2; 439/687
[58] Field of Search ...................... 439/170, 171, 439/172, 174, 175, 540, 173, 269.2, 687, 188; 200/51.1, 151.09, 51.08, 51.06

[56] References Cited

U.S. PATENT DOCUMENTS

| | | | |
|---|---|---|---|
| 774,611 | 11/1904 | Sprague | 439/680 |
| 2,254,754 | 9/1941 | Reece | 439/269.2 |
| 3,025,486 | 3/1962 | Falconer | 439/172 |
| 4,367,370 | 1/1983 | Wilson et al. | 439/171 |
| 4,464,832 | 8/1984 | Asick et al. | 29/839 |
| 4,626,054 | 12/1986 | Rumble | 439/173 |
| 4,666,223 | 5/1987 | Tillman | 439/171 |
| 5,038,005 | 8/1991 | Hohorst et al. | 439/171 |
| 5,052,949 | 10/1991 | Lopata et al. | 439/687 |
| 5,096,431 | 3/1992 | Byrne | 439/171 |

FOREIGN PATENT DOCUMENTS

| 0761603 | 6/1967 | Canada | 439/171 |
|---|---|---|---|

*Primary Examiner*—Hien Vu
*Attorney, Agent, or Firm*—Kenneth E. Darnell

[57] ABSTRACT

Plug-in connectors primarily intended for connecting lighting fixtures into system circuitry, the connectors include selector mechanisms which allow selection of a hot conductor or conductors necessary for energization of the fixtures. The connectors of the invention allow selection of a specific circuit at the job site rather than pre-wiring of a fixture to a specific circuit during factory assembly, a given fixture then being rapidly installed by plugging of the connector into a tapping port in electrical cable extending between fixtures in an installation. The selection mechanism of the invention acts primarily to change the wiring configuration of the associated fixture with the hot leg or legs of the fixture being movable to adapt to a desired specific circuit. The invention further encompasses use of the apparatus of the invention in a method for rapidly wiring fixtures into system circuitry, thereby resulting in labor and job cost savings. While the invention is particularly useful for connecting HID fixtures into system circuitry, the connectors of the invention can also be used in systems employing incandescent and fluorescent lighting as well as other appropriate electrical loads.

57 Claims, 9 Drawing Sheets

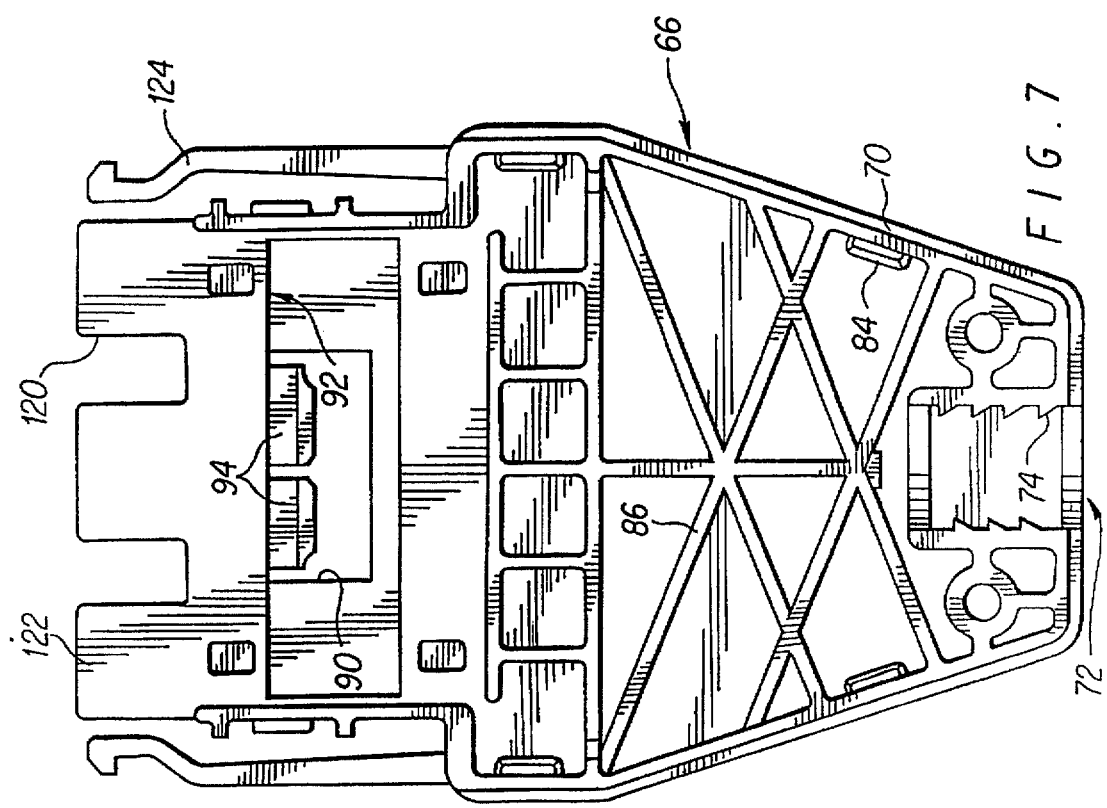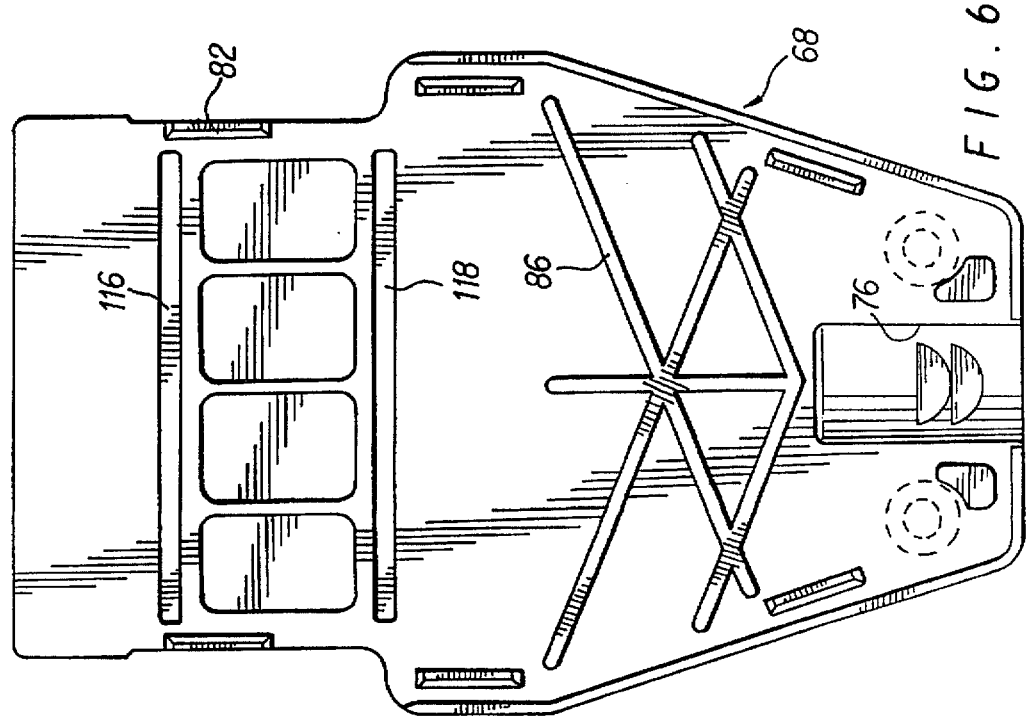

APPARATUS FOR SELECTING FIXTURE CONDUCTORS AND METHOD FOR RAPIDLY WIRING SAID FIXTURES

This application is a continuation of application Ser. No. 08/198,840, filed Feb. 18, 1994, now abandoned.

BACKGROUND OF THE INVENTION

1. Field of the Invention

The invention relates generally to the installation of lighting fixtures and the like in a use environment and particularly relates to a connector associated with such fixtures whereby the connector includes a selection mechanism allowing selection of hot conductor(s) necessary for energization of the fixture.

2. Description of the Prior Art

Lighting fixtures and other circuit loads are typically installed in electrical wiring systems in a variety of ways. A wiring system known particularly in the industrial lighting field goes by the mark RELOC which is a trademark of Lithonia Lighting, a Division of National Service Industries, Inc. of Atlanta, Ga. This well-known RELOC system is particularly useful in the installation of both high bay and low bay lighting systems wherein HID fixtures are employed. In such a prior system, known usually in the field as hardwire industrial HID, it has been necessary to undergo three or more passes up and down a row of lighting fixtures in order to install conduit, to pull wire, and hang and energize fixtures. In this conventional approach which differs from the Lithonia RELOC system, a tremendous amount of labor is employed to install the HID fixtures or other loads which form a part of the system circuitry. While the previously known RELOC system facilitates the construction of such an installation, it has been necessary to sort similarly wired fixtures into groups prior to installation so that fixtures with differing circuit configurations were not installed in the same branch circuit or row.

When hardwiring typical industrial fixtures in an installation, whether HID, incandescent or fluorescent, it is necessary for an installer to set a junction box, cut conduit, set fixture mounting boxes, pull wire and cut and strip conductors even before the fixtures themselves can be hung. After fixture hanging, it is still necessary to connect conductors to each fixture. All of these operations easily require three or more passes up and down each row of fixtures with the labor of installation accounting for 70 to 80% of the total branch circuitry job cost. When utilizing the present invention in a system similar to the conventional RELOC system, it is only necessary to make a single pass along each row of fixtures in order to plug the system together and hang the fixtures. Accordingly, typical lighting installations and the like are installed in a fraction of the time necessary for installing such fixtures by the conventional "pipe and wire process". The present invention particularly allows each fixture to be plugged into system circuitry with a selector mechanism associated with the fixture so that the desired hot conductor(s) necessary to energize the individual fixture can be chosen at the time of installation, all fixtures having previously been wired the same way. The present invention thus eliminates the need to coordinate differently circuited fixtures. The prior art has thus felt a long-standing need for a more rapidly installable system having the advantages which accrue from the inventive features of the present invention.

SUMMARY OF THE INVENTION

The invention provides system circuitry primarily intended for connecting lighting fixtures together by means of a plug-in connector associated with each fixture in the system. The plug-in connector includes a selector mechanism which can be set at the time of installation to cause the wiring configuration of the fixture to assume that configuration necessary for installation of the fixture into the system circuitry. The invention is useful with high intensity discharge lighting (HID) and can be used also with incandescent and fluorescent systems inter alia. Since HID and other lighting systems can operate at different voltages, different configurations of the selector mechanism have been developed according to the invention. Through utilization of one of the plug-in connectors of the present invention, it is possible to match those fixtures which are to be on a given circuit. Accordingly, those fixtures on a particular circuit can then be properly tapped and operated at the proper voltage. The invention thus relieves the necessity for pre-wiring a fixture a certain way at the factory and then being forced at the installation site to assure that all fixtures are similarly wired and matched to fit on a particular circuit together. The connectors of the invention include selector mechanisms which allow selection of a hot conductor(s) necessary for energization of a fixture.

The present invention particularly allows a method of assembly of fixtures within a circuit to which the present plug-in connectors can be rapidly installed, the systems within which the present plug-in connectors are commonly used being those wiring systems known as RELOC systems, a trademark of Lithonia Lighting and National Service Industries, Inc. The RELOC systems are so named due to their ability to be relocated with system components being reusable.

The simplicity of installation afforded by the present plug-in connectors results in an installation method which enables an installer to make only a single pass along a row of fixtures which are to be installed. In conventional situations wherein industrial fixtures are hardwired in a given row of fixtures, it is necessary for an installer to set the junction box, cut conduit, set fixture mounting boxes, pull wire and cut and strip conductors even before the fixtures can be hung and conductors then mated to each fixture. All of these functions typically require three or more passes up and down each row of fixtures. Utilizing the present invention, methodology is disclosed wherein only a single pass is required to install each fixture, thereby resulting in substantial labor cost reductions. In the present system, all fixtures and system components are reusable and easily relocated if circuitry changes are necessary due to layout revision or expansion. The fixtures employed in the present system can even be used for temporary lighting during facility construction and rearranged for permanent lighting.

Accordingly, it is an object of the invention to provide a plug-in connector having a selector mechanism, which connector can be employed particularly in a RELOC system and which connector is associated in a particular field of use with HID lighting fixtures whereby each lighting fixture in a given row of fixtures can be pre-wired at the factory or wired on site with the selector mechanism then being employed for selection of a hot conductor or conductors necessary for energization of the fixture.

It is another object of the invention to provide a plug-in connector associated with a lighting fixture or other electrical load and having a selection mechanism capable of changing the wiring configuration of the fixture in order to match the fixture wiring with a desired hot leg or legs.

It is a further object of the invention to provide a relocatable system including pre-wired electrical loads having a plug-in connector associated with the load, the connector having a selector mechanism which allows selection of characteristics necessary for operation of the load.

Further objects and advantages of the invention will become more readily apparent in light of the following detailed description of the preferred embodiments.

BRIEF DESCRIPTION OF THE DRAWINGS

FIG. 6 is a plan view of the interior of the rear housing of the embodiment of FIG. 3;

FIG. 7 is a plan view of the interior of the front housing of the embodiment of FIG. 3;

DESCRIPTION OF THE PREFERRED EMBODIMENT

Figure 1:
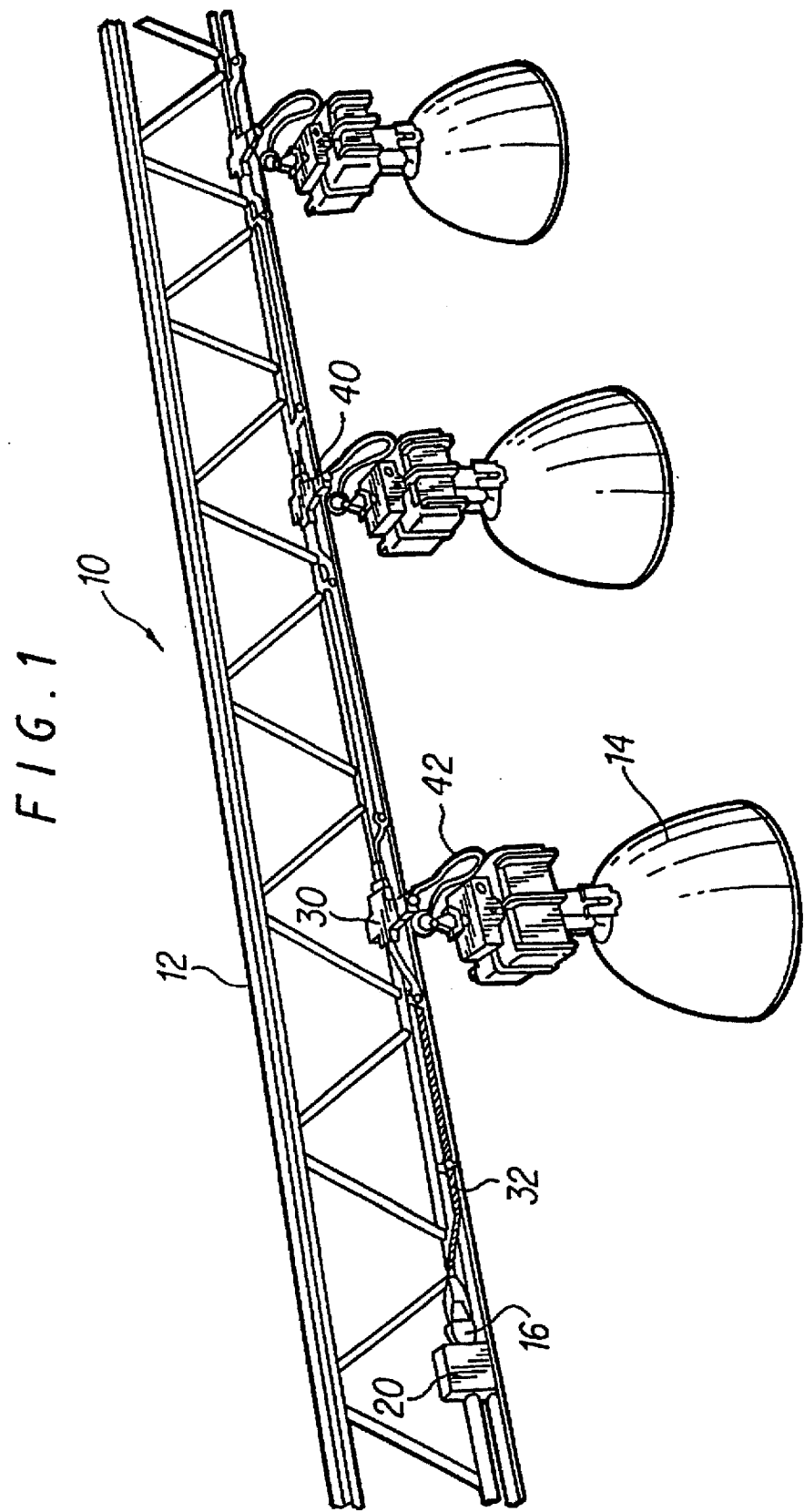
FIG. 1 is a perspective view of the invention configured in a use environment represented by an industrial high intensity discharge lighting fixture installation.
Figure 2:
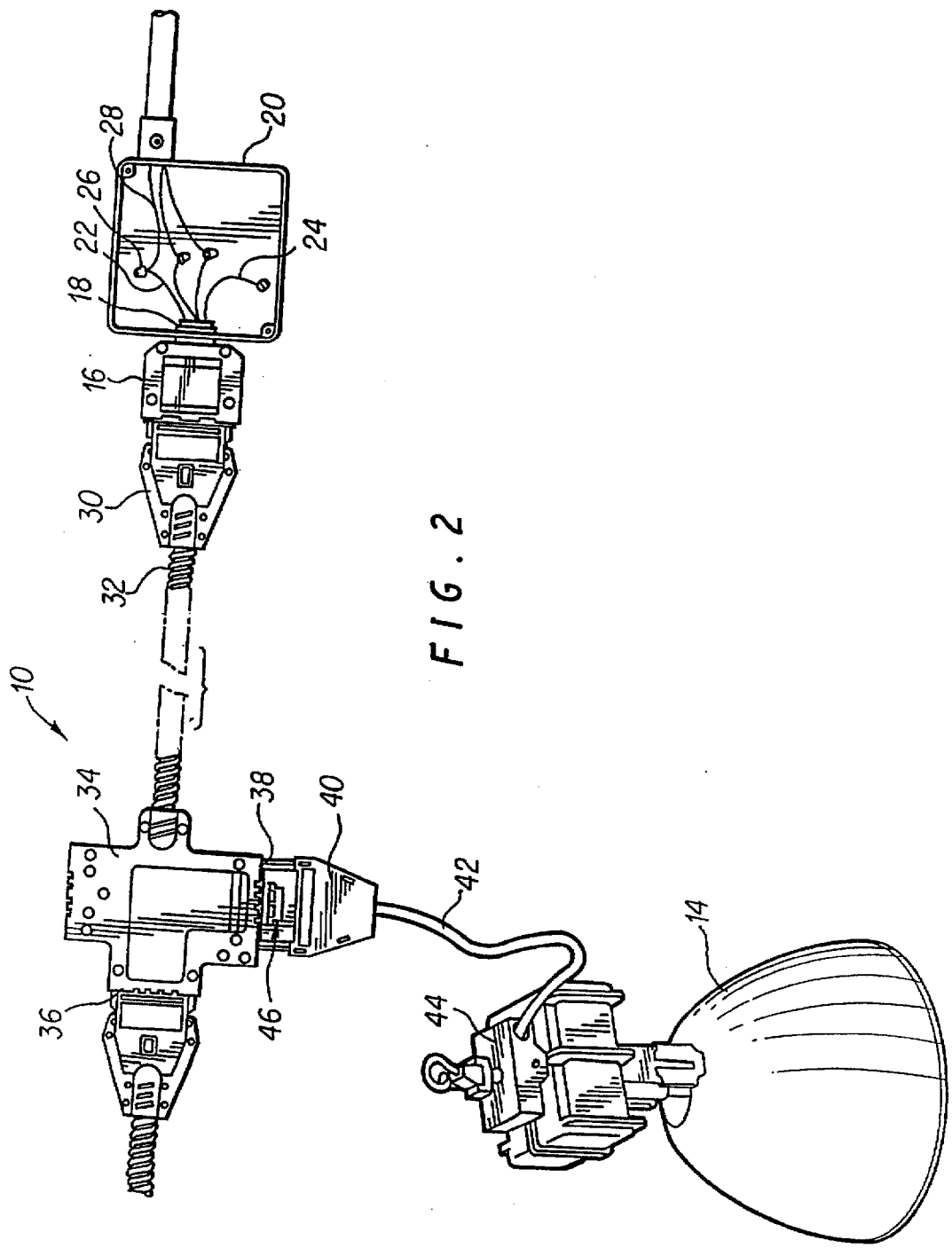
FIG. 2 is a perspective view of the major components of a relocatable wiring system utilizing the method and apparatus of the invention.

Referring now to the drawings and particularly to FIGS. 1 and 2, an industrial lighting system embodying the invention is seen generally at 10 and is mounted to support 12 which essentially supports a row of a system of HID lighting fixtures 14. An installation such as is seen in FIGS. 1 and 2 can be of the high bay or low bay type and can utilize lighting fixtures other than high intensity discharge. Further, the electrical loads in such a system could be lighting fixtures other than HID fixtures such as incandescent or fluorescent fixtures. For purposes of installation, the invention is readily described within the context of an HID system with emphasis on the underlying wiring system. As seen in the drawings, the system 10 is capable of operation at differing voltages. Under such circumstances, the particular apparatus and methodology of the present invention can readily be appreciated in light of the use environment shown in FIGS. 1 and 2.

The system 10 includes a circuit distributor 16 which is conventional in the art, the distributor 16 connecting by means of locknut 18 to a junction box 20. Wire leads 22 including ground connection 24 extend from the interior of the circuit distributor 16 into the interior of the junction box 20 wherein the ground connection 24 is attached according to local code and the leads 22 are connected conventionally by wirenuts 26 or the like to appropriate outlet leads 28. The circuit distributor 16 is provided at its free end with contacts (not shown) of a conventional nature and which mate at the free end of the distributor 16 with corresponding mating contacts (not shown) of pluggable connector 30 located at the free end of cable 32. The opposite end of the cable 32 is fixed into connector housing 34 which has two pluggable ports 36 and 38 formed therein. Each of the ports 36 and 38 are provided with conventional contacts (not shown) which mate to allow a mounting of connector units either identical to or similar to the pluggable connector 30. In practice, the port 36 is aligned with the cable 32 and receives a connector identical to the pluggable connector 30 into said port 36 so that multiple units of the connector 30/cable 32/connector housing 34 can be plugged together to form a heavy-duty "extension cord" of any desired length which is a multiple of said units and which extends along a row into which the lighting fixtures 14 are to be mounted. The system thus described is similar, at least as regards the distributor 16, the connector 30, the cable 32 and the connector housing 34 with a port 36, to the RELOC system previously mentioned, this prior RELOC system representing a well-known standard of performance and reliability in the industry.

Illustration of the length of the cable 32 requires for convenience that the cable 32 be illustrated as being much shorter than is the situation in an industrial installation. While the cable 32 is shown as being an armored cable due to the high voltages, etc., which are normally employed in installations of this nature, it is to be understood that the cable 32 could be configured other than as is shown, such as being insulated other than as is shown in the drawings.

Figure 3:
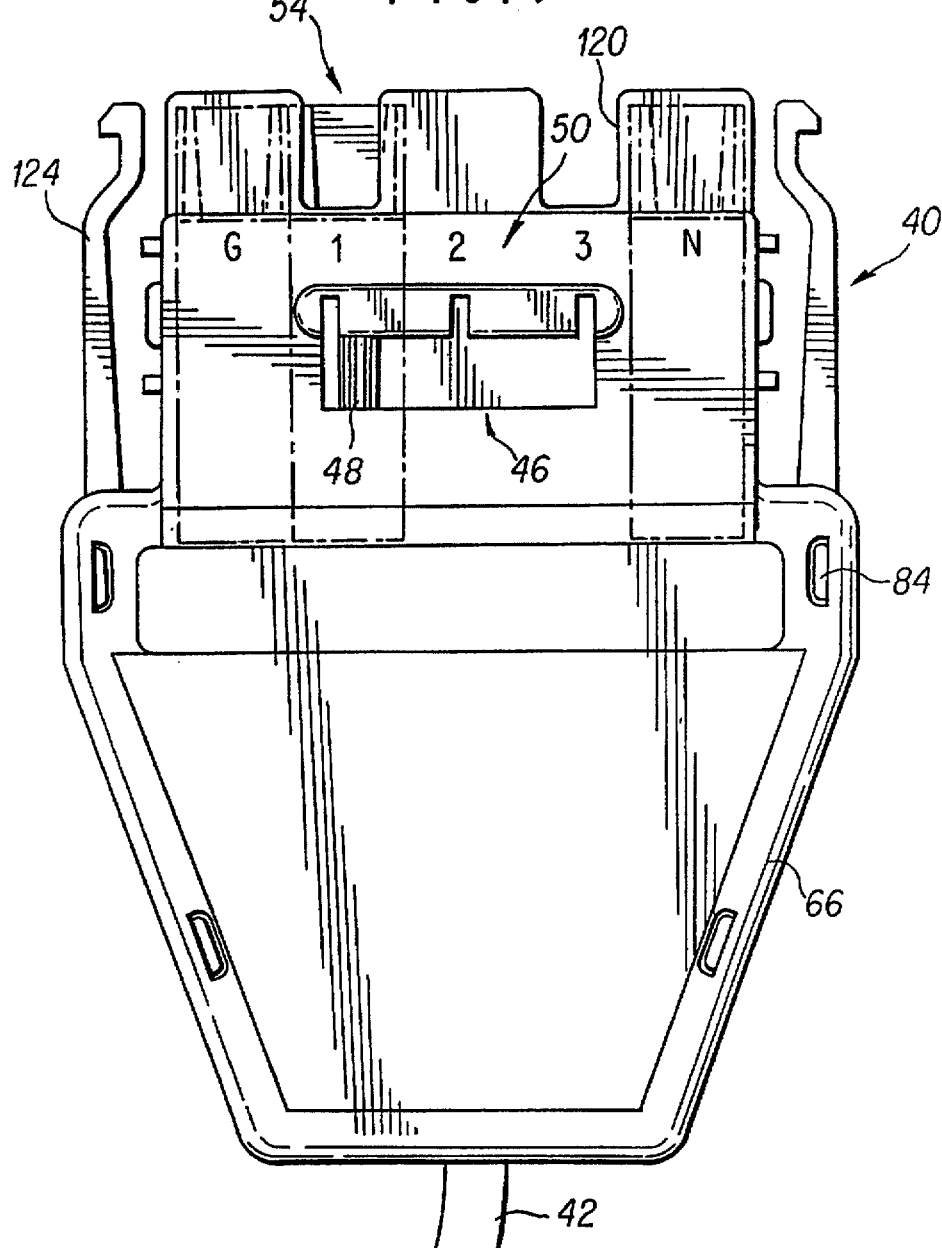
FIG. 3 is an elevational view of a circuit selector connector configured according to a first embodiment of the invention.
Figure 4:
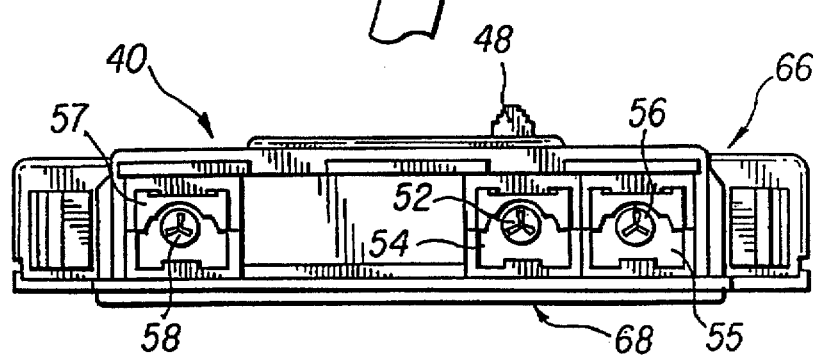
FIG. 4 is an end elevational view of the apparatus of FIG. 3.
Figure 5:
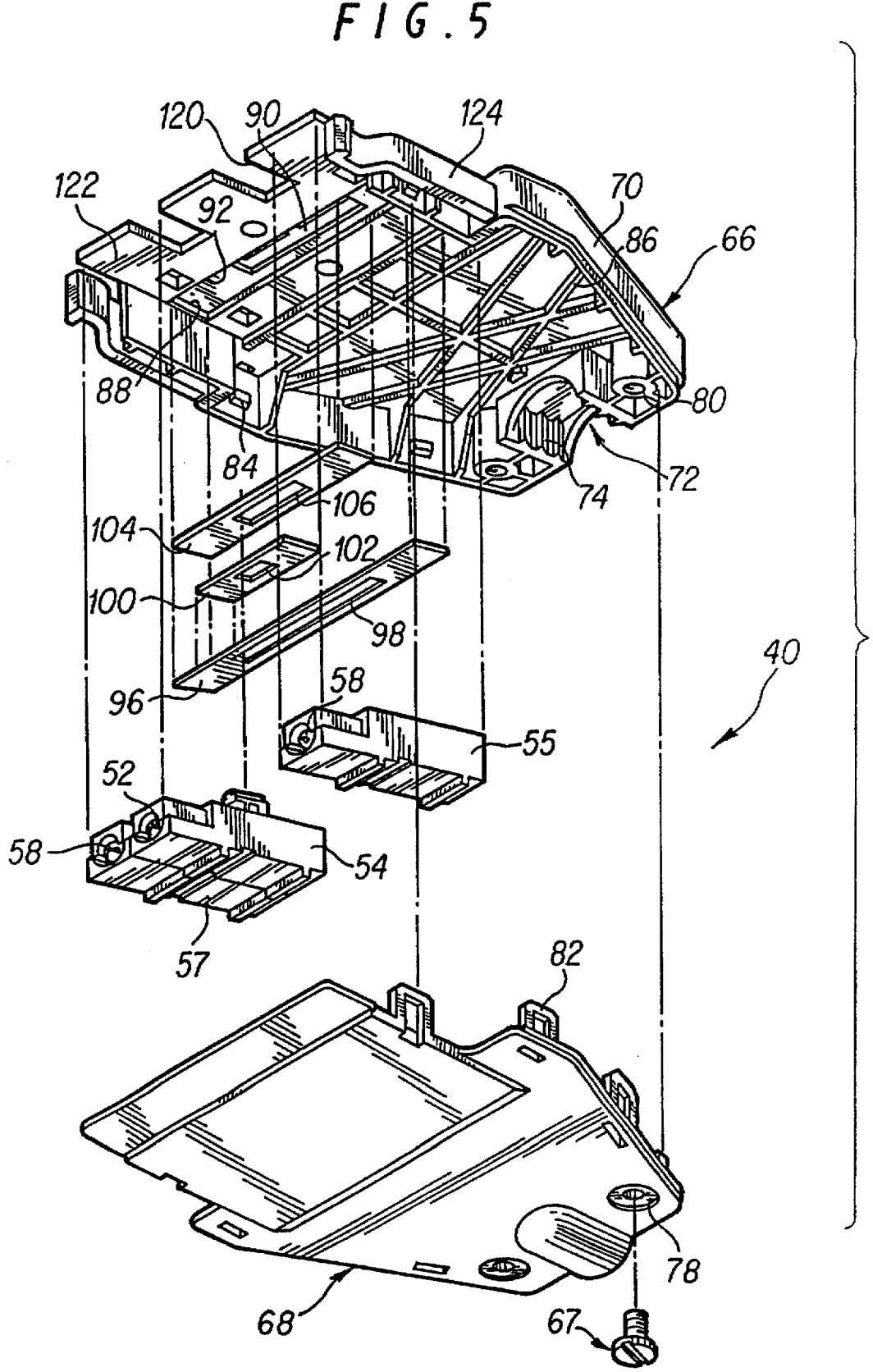
FIG. 5 is an exploded assembly view of the embodiment of FIG. 3.

The port 38 in the connector housing 34 mates with a selection port 41 of selector plug 40 through an electrical contact arrangement which is shown best in FIGS. 3–5. The selection port 41 essentially constitutes the free end of the selector plug 40 and mounts electrical contacts to be described hereinafter. The selection port 41 mates with the port 38 (or the port 36) of the connector housing 34 thereby to allow the selector plug 40 to be connected to the housing 34. The port 38 is typically provided with female electrical contacts (not shown) which are disposed in a row and at least three of which contacts mate with corresponding pin contacts 52, 56 and 58 located in the selection port 41 of the selector plug 40 to cause the selector plug 40 to be received into the port 38 for a secure connection to the connector housing 34. The selector plug 40 receives a flexible cord 42 at one end thereof for connection interiorly of said plug 40 to the contacts 52, 56 and 58, the opposite end of the flexible cord 42 being secured into splice box 44 on one of the lighting fixtures 14. The flexible cord 42 carries three conductor wires (not shown), the anterior ends of said wires being conventionally connected interiorly of the splice box 44 to appropriate leads (not shown) of the fixture 14 for operation of the fixture 14 upon energization of the system 10 and/or the fixture 14. The wiring within the fixture 14 usually occurs at a factory assembly location with selection of the ultimate wiring configuration of the fixture 14 being capable of field selection through use of the structure of the selector plug 40 as will be described in detail hereinafter. It is to be noted that fixture wiring can be accomplished at a field installation site if desired.

Utilizing the structure thus described, it is possible to install the lighting fixtures 14 with only a single pass along the row of fixtures defined by the cumulative lengths of the cables 32. In prior art installations wherein the fixtures 14 would be hardwired in place, an installer must set the junction box 20, must cut conduit within which wires must be pulled, must set fixture mounting boxes, cut and strip conductors and then hang fixtures followed by connecting the conductors to each fixture by means of connectors such as wirenuts. Such prior art assembly can require three or more passes up and down each row of fixtures, thereby causing labor costs to be substantial in view of the time necessary to accomplish all of these functions. Still further, much material is required in prior art hardwiring processes as described, this material including conduit, wire, couplings, connectors, wirenuts, miscellaneous hardware, etc. As importantly, the system 10 as described reduces labor costs and renders possible the relocation and reuse of all of the components shown and described relative to FIGS. 1 and 2. Use of the present system 10 allows the fixtures 14 and the components connecting and associated with the fixtures 14 to be relocated due to circuitry changes brought about by layout revisions or expansion.

Referring now to FIGS. 3, 5 and 7–9, the selector plug 40 can be seen to include a selector mechanism 46 which allows on site selection of the wiring configuration of the fixture 14 so that the wiring of all of the fixtures 14 in a circuit can be matched with the desired hot leg. This ability to effectively change or select the wiring configuration of the fixtures 14 on site eliminates the previous practice of pre-wiring a lighting fixture to a specific circuit at the factory with the subsequent necessity of sorting the fixtures on the job site to make certain that all of the fixtures 14 which are to be placed in a given circuit are properly wired for that circuit. The selector mechanism 46 allows selection at the site of the appropriate wiring of each fixture 14 which is to be placed into a given circuit, that is, a given electrical arrangement of fixtures.

The selector mechanism 46 is seen to include a thumb-slide element 48 which can be moved to three separate positions identified by indicia 50, the positions being shown as position 1, position 2 and position 3. These positions are the positions at which a movable contact housing 54 (seen best in FIGS. 5 and 8) can be moved by manipulation of the thumbslide element 48. As is seen in the drawings, the thumbslide element 48 is fixed to one side of the contact housing 54 such that manual manipulation of the thumbslide element 48 from a position exteriorly of the selector plug 40 allows the housing 54 to be moved to either one of the positions 1, 2 or 3. The contact housing 54 houses the pin contact 52 and thus carries the pin contact 52 to a desired one of the positions 1, 2 or 3 on movement of the contact housing 54 to the said positions. A fixed ground contact housing 55 houses the contact pin 56 and is disposed within the selector plug 40 with the indicia "G" formed on the exterior of the plug 40 identifying the location of the contact pin 56 which is the ground contact. The contact pin 56 thus forms the contact portion of a ground leg of the circuitry. Similarly, a fixed neutral contact housing 57 houses the contact pin 58 and is fixedly held within the plug 40 at the location marked by the indicia "N" as is best seen in FIGS. 3 and 5. The contact pin 57 forms the contact portion of a neutral leg of the circuitry. Both of the contact housings 55 and 57 are fixed in position within the plug 40 and are not movable. Only the contact housing 54 and the pin contact 52 carried by the housing 54 moves to one of the three positions designated 1, 2 and 3 to cause the pin contact 52 to appropriately mate with corresponding contacts (not shown) in the port 38 formed in the connector housing 34 to select the appropriate wiring configuration for operation of the fixture 14. The contact pin 58 forms the contact portion of a hot leg of the circuitry. The selector plug 40 thus allows each fixture 14 to tap into the circuit formed by the multiplicity of the cables 32 and the associated pluggable connectors 30 and connector housings 34/ports 36 as has been described above. By the appropriate selection of the indicia 1, 2 or 3, all of the fixtures 14 which are to be connected into a given circuit will have the appropriate wiring configuration and matched wiring so that the appropriate circuit is caused to be selected by the simple expedient of the selector mechanism 46.

Although not shown in the drawings for ease of illustration, electrical leads (not shown) directly connect within the plug 40 to the several pin contacts 52, 56 and 58 and function as hot, ground and neutral legs respectively. The selector plug 40 is primarily intended for use with either 120 volt, 277 volt or 347 volt voltage sources. The plug 40 is also seen to allow removal of any one of the fixtures 14 from the circuitry of the system 10 without interrupting said circuitry and without the need to add any additional components to the circuitry.

Considering now the particular structure of the selector plug 40, reference is made to FIGS. 3 through 7 with particular reference being made to FIG. 5. The selector plug 40 is seen to be formed of front and rear housings 66 and 68 with the front housing 66 having a body wall 70 which extends about most of the periphery of the front housing 66. A toothed cord access port 72 is formed by mating port elements 74 and 76 formed respectively in the housing 66 and 68, one end of the flexible cord 42 extending into said access port 72 to allow leads (not shown) to electrically connect to respective pin contacts 52, 56 and 58. The housings 66 and 68 can be conventionally connected together such as through the use of self-threading screws such as screw 67, one each of which extend through one of the apertures 78 in the rear housing 68 to connect into bosses 80 formed in the front housing 66, two of the screws 67 being used although only one of the screws 67 being shown for ease of illustration. Snap-fit elements 82 which extend perpendicularly from the plane of the rear housing 68 mate with snap-fitting hubs 84 positioned on the front housing 68 such that the elements 82 snap into engagement with the nubs 84 to fit the housings 66 and 68 together. Certain ones of the snap-fit elements 82 and of the associated mating nubs 84 are located interiorly of that housing formed by the mating of the housings 66 and 68 while certain others of the snap-fit elements 82 and of the associated nubs 84 are located exteriorly of that housing formed by the mating of the housings 66 and 68. As is seen in the drawings, four of the element 82/84 combinations are located inside of the combined housings 66 and 68 while two of the element 82/nub 84 combinations are located exteriorly of the combined housings 66 and 68. Slots 85 formed in the housing 68 adjacent to and spaced from perimetric edges of the housing 68 and opposite bight portions of the U-shaped snap-fit elements 82 allow disengagement of the elements 82 and the nubs 84 through use of a conventional tool. Cut-outs 87 formed in the housing 68 in perimetric edges thereof and surmounted by the elements 82 located exteriorly of the combined housings 66 and 68 facilitate disengagement of the elements 82 and the nubs 84. The housings 66 and 68 can further be formed with reinforcing ribs 86 and the like to add strength to the assembly thus formed by the front and rear housings 66 and 68. The housings 66 and 68 are formed of an appropriate material, such as a polymeric material, which provides dimensional stability, chemical resistance, low moisture absorption and high heat resistance. Many such materials are available and the selection of such a material is well within conventional choice.

Figure 8A:
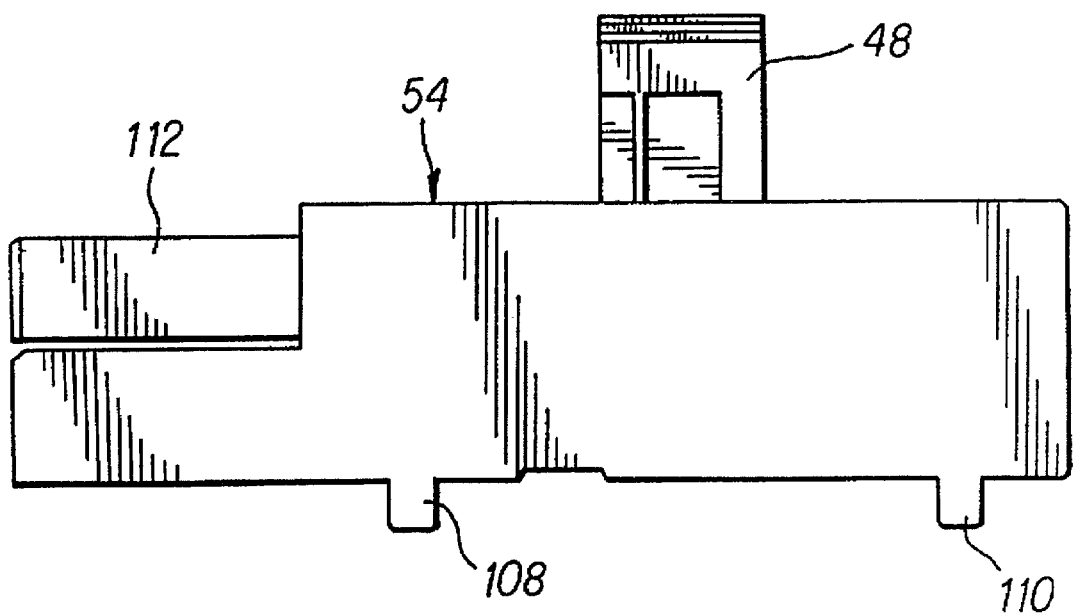
FIGS. 8A and 8B are side elevational and rear elevational views respectively of the contact housing of the embodiment of FIG. 3.
Figure 8B:
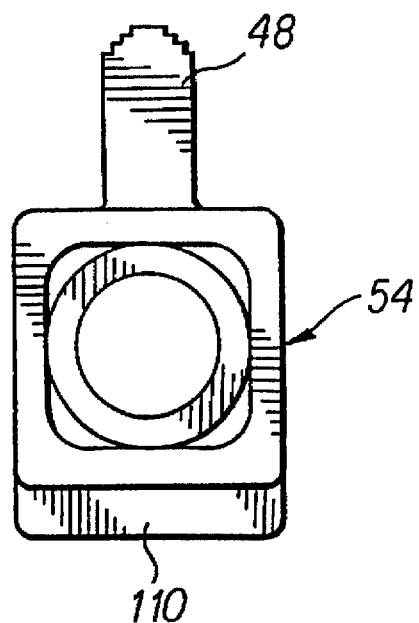
Figure 9A:
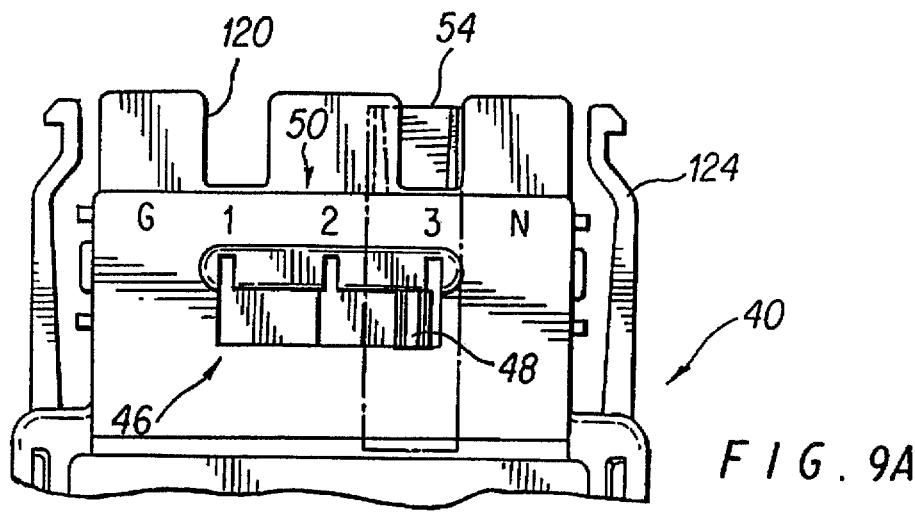
FIGS. 9A, 9B and 9C are detailed views illustrating the positions of the selector mechanism of the embodiment of FIG. 3.
Figure 9B:
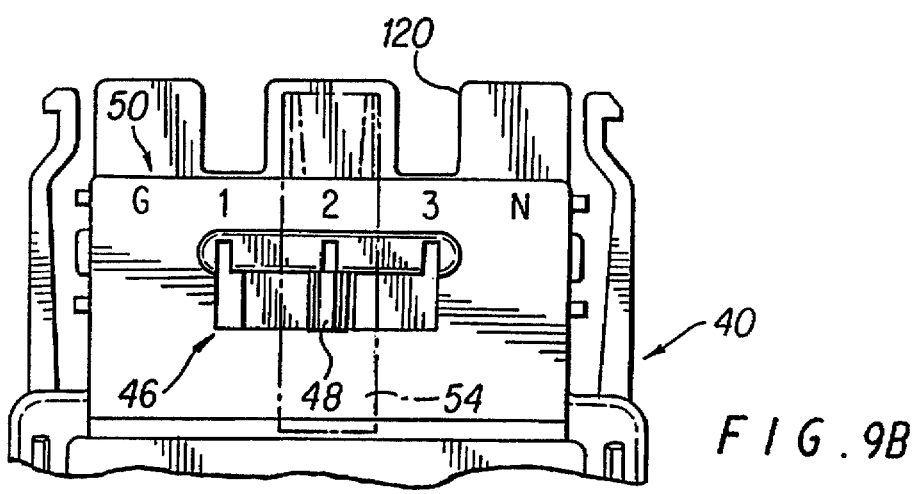
Figure 9C:
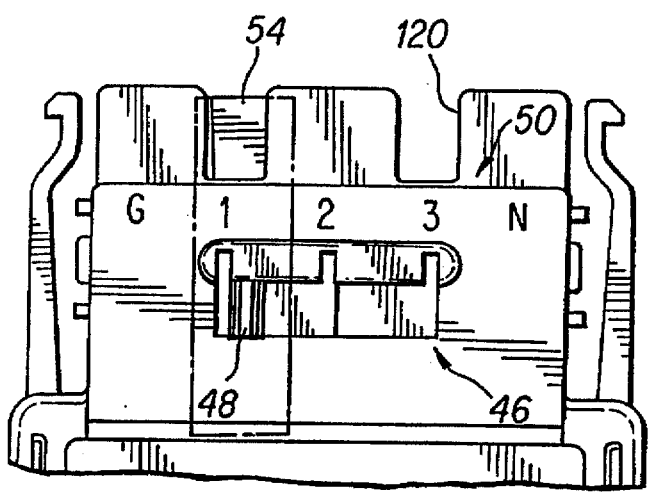

Referring particularly to FIGS. 3, 5 and 9, it is to be seen that the pin contact 52 is positioned as desired through use of the thumbslide element 48. While the ground pin contact 56 and the neutral pin contact 58 are fixed in the positions shown, the movable pin contact 52 can slide between the three positions described above so that a desired wiring configuration is selected. As can also be seen with reference to FIG. 5, the selector mechanism 46 includes more than the thumbslide element 48. In fact the element 48 actually is a portion of the contact housing 54 as is best seen in FIGS. 5 and 8. The selector mechanism 46 includes a number of other cooperating elements. In particular, the front housing 66 is provided with a rectangular recess 88 extending axially across the longitudinal axis of the housing 66, the recess 88 having a cut-out portion 90 formed essentially equidistantly between the ends of the recess 88 with the outer margin of the cut-out portion 90 being identical to the mid-portion of wall 92 of the recess 88. Alignment tabs 94 extend from the outer periphery of the wall 92 and into the interior of the recess 88 through the cut-out portion 90. The alignment tabs 94 are essentially disposed side-by-side along that portion of the wall 92 which corresponds to the cut-out portion 90. The recess 88 receives a thin rectangular plate 96 fully thereinto with the plate 96 being fixed in position within the recess 88 by virtue of being flushly received thereinto. The plate 96 has a rectangular aperture 98 formed centrally therein with respect to the opposite ends of the plate 96 with the aperture 98 having a length which is approximately half of the length of the plate 96. Exact dimensions of a preferred embodiment will be provided hereinafter for the components of the selector mechanism 46. The aperture 98 is not quite centered in the plate 96 relative to the long edges of said plate 96 as will be described in more detail hereinafter. The plate 96 serves to cover the recess 88 and hold other plates therewithin. One of the other plates is interior plate 100 which is slightly less than half the length of the plate 96 and is disposed between the plate 96 and third plate 104 and can be movable relative thereto. The interior plate 100 has the same width as the plate 96 and is also formed with a rectangular aperture 102 which has a longitudinal axis which is perpendicular to the longitudinal axis of the aperture 98 formed in the plate 96. The "length" of the aperture 102 is essentially identical to the "width" of the aperture 98. The width of the aperture 102 is sufficiently large to receive the thumb-slide element 48 therethrough, the thumbslide element 48 thus extending through the aperture 98 in the plate 96 in order to be received within the aperture 102 of the interior plate 100. A third plate 104 is disposed within the recess 88 against the floor of said recess 88 and sandwiches the interior plate 100 between itself and the plate 96, the third plate also being rectangular in conformation and having a rectangular aperture 106 formed therein. The length of the third plate 104 is essentially identical to the length of the aperture 98 formed in the plate 96 plus the length of one of the solid end portions of the plate 96. The width of the aperture 106 is essentially identical to the width of the aperture 98 formed in the plate 96. The thumbslide element 48 also extends through the aperture 106 in the plate 104, the thumbslide element 48 extending from one side of the contact housing 54 through the respective apertures 98, 102 and 106 in said plates 98, 100 and 104 such that the thumbslide element 48 extends externally of the selector plug 40 in order to be available for manual manipulation by a user.

Due to the dimensions of the plates 96, 100 and 104 and of the apertures 98, 102 and 106, the thumbslide element 48 can be moved from position 1 to position 2 and then on to position 3 without a discontinuity appearing in the recess 88 when viewed from externally of the selector plug 40. While the plate 96 remains stationary and the plate 100 moves along with the thumbslide element 48 (and thus the contact 52), the third plate 104 allows sufficient play of the thumbslide element 48 in order to move therewith only along a portion of travel of the contact 52. The thumbslide element 48 can thus be employed to move the contact housing 54 and associated pin contact 52 between the positions designated 1, 2 and 3 as desired and without revealing a discontinuity or opening in the cut-out portion 90 of the recess 88, thereby to prevent dust or other foreign matter from gaining entry into the interior of the selector plug 40 or to prevent contact between the live electrical leads within the interior of the plug 40 with anything outside of said plug 40.

As can best be seen in FIGS. 5 and 8, the contact housing 54 is provided with front and rear track followers 108 and 110 which are formed integrally with the housing 54 on the side thereof opposite the thumbslide element 48. As can be seen in the drawings, the contact housing 54 essentially comprises a rectangular solid having a reduced split portion 112 at the front thereof. The pin contact 52 is received within the interior of the contact housing 54 and connects to the appropriate hot lead as has previously been described. The front and rear track followers 108 and 110 respectively fit within front and rear tracks 116 and 118 formed in the rear housing 68 in opposite relation to the recess 88. The distance between the parallel front and rear tracks 116 and 118 is preferably taken to be greater than the width of the recess 88 at least by a dimension equal to twice the width of either one of the tracks 116, 118. The front track 116 thus lies slightly forward of the wall 92 of the recess 88 and the rear track 118 lies slightly to the opposite side of the recess 88. The track followers 108, 110 thus fit into the tracks 116, 118 and allow the movable contact housing 54 and pin contact 52 to positively ride along a fixed path on manual manipulation of the thumbslide element 48.

The front housing 66 is provided with cut-out portions 120 in the plate-like free end portion 122. The cut-out portions 120 are located in positions which enable the selector plug 40 to be mated with the port 38 of the connector housing 34 only when the plug 40 is wired for a particular voltage for which the system circuit is rated. Crimps 39 formed in an edge of the port 38 align with the cut-out portions 120 when the selected voltage for the system is set for both the plug 40 and the connector housing 34 such that the portions 120 allow the plug 40 to be received into the port 38.

The front housing 66 is provided with self-latching springs 124 on either side thereof which connect with corresponding structure (not shown) formed about the port 38 of the pluggable connector 34, such structure being conventional in the art. Exterior surfaces of the front housing 66 can be provided with information in addition to the indicia 50 and can be molded onto outer surfaces of the front housing 66 during a usual molding operation.

In order to appreciate the relative relationship of the plates 96, 100 and 104 especially in relation to the apertures 98, 102 and 106 respectively formed therein, the dimensions of structure suitable for use with a typically sized plug 40 are now provided. Referring to the plate 96, the plate 96 is stamped from 0.017 inch thick LEXAN FR700 film and is nominally taken to be 1.520 inches in length and 0.395 inches in width. The width of the aperture 98 is 0.200 inch and the length of the aperture 98 is 0.775 inch. The aperture 98 is spaced 0.365 inch and 0.380 inch respectively from the ends of the plate 96 and is spaced 0.085 inch from one long edge of the plate 96 and 0.110 inch from the opposite, parallel edge.

The interior plate 100 is similarly formed by stamping from the same material and is 0.710 inch in length and 0.395 inch in width. The "length" of the aperture 102 is 0.200 inch with the width thereof being 0.110 inch. The aperture 102 is disposed 0.300 inch from either end of the plate 100 and is spaced 0.085 inch from one long edge of the plate 100 and 0.110 inch from the opposite, parallel edge of said plate 100.

The third plate 104 is formed of the same material and has the same thickness as do the plates 96 and 100. The length of the third plate 104 is 1.145 inch and the width is 0.395 inch. The width of the aperture 106 is 200 inch and the length is 0.400 inch. The aperture 106 is spaced 0.365 inch and 0.380 inch respectively from the ends of the plate 104 and is spaced 0.085 inch from one long edge of the plate 104 and 0.110 inch from the opposite, parallel edge.

As can readily be understood, the dimensions of the plates 96, 100 and 104 can vary as can the dimensions of the apertures 98, 102 and 106. However, the relationship represented by the dimensions given accomplish the function intended as described above even though other dimensional relationships can be chosen.

Figure 11A:
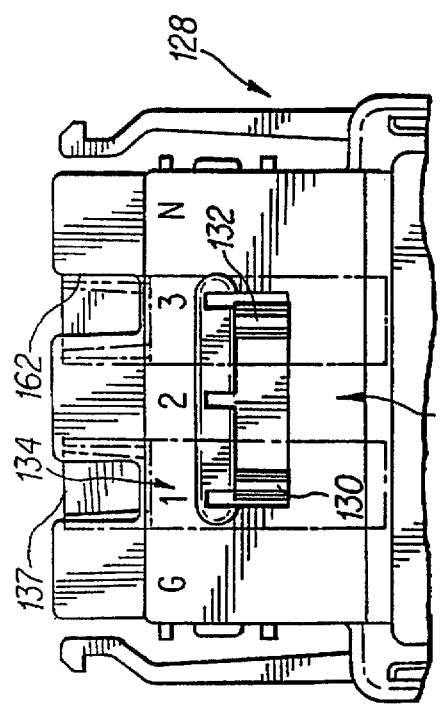
FIGS. 11A and 11B are detailed views illustrating the other two positions of the thumbslides within the selector mechanism of the embodiment of FIG. 10; and, FIG. 12 is an exploded assembly view of the embodiment of FIG. 10.
Figure 11B:
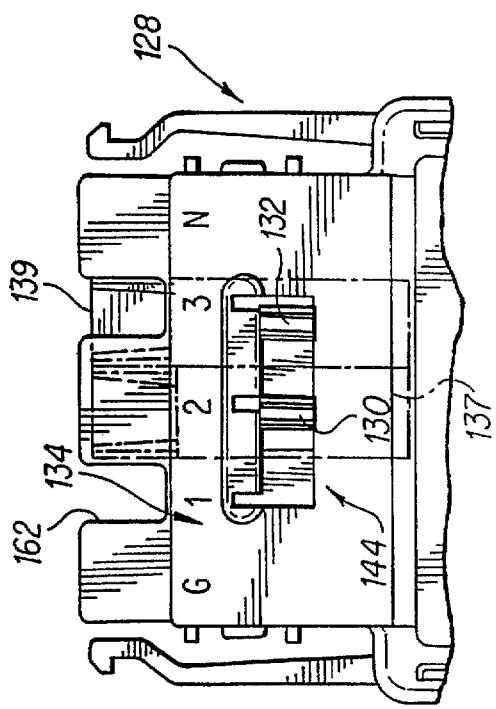
Figure 10:
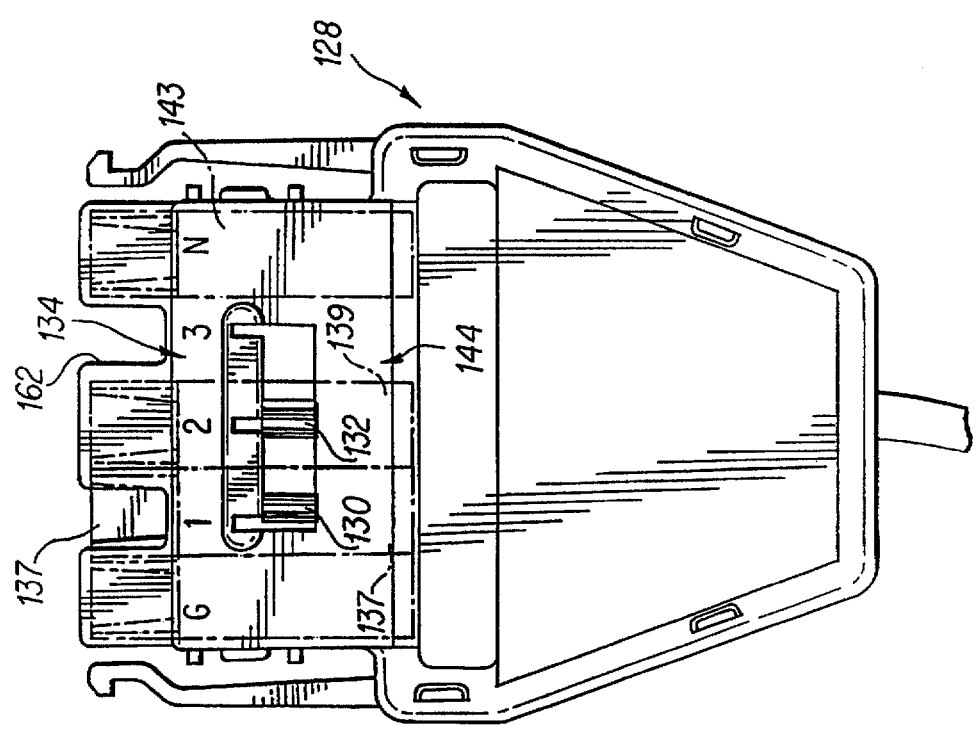
FIG. 10 is an elevational view of a circuit selector connector configured according to a second embodiment of the invention and utilizing two thumbslide structures.
Figure 12:
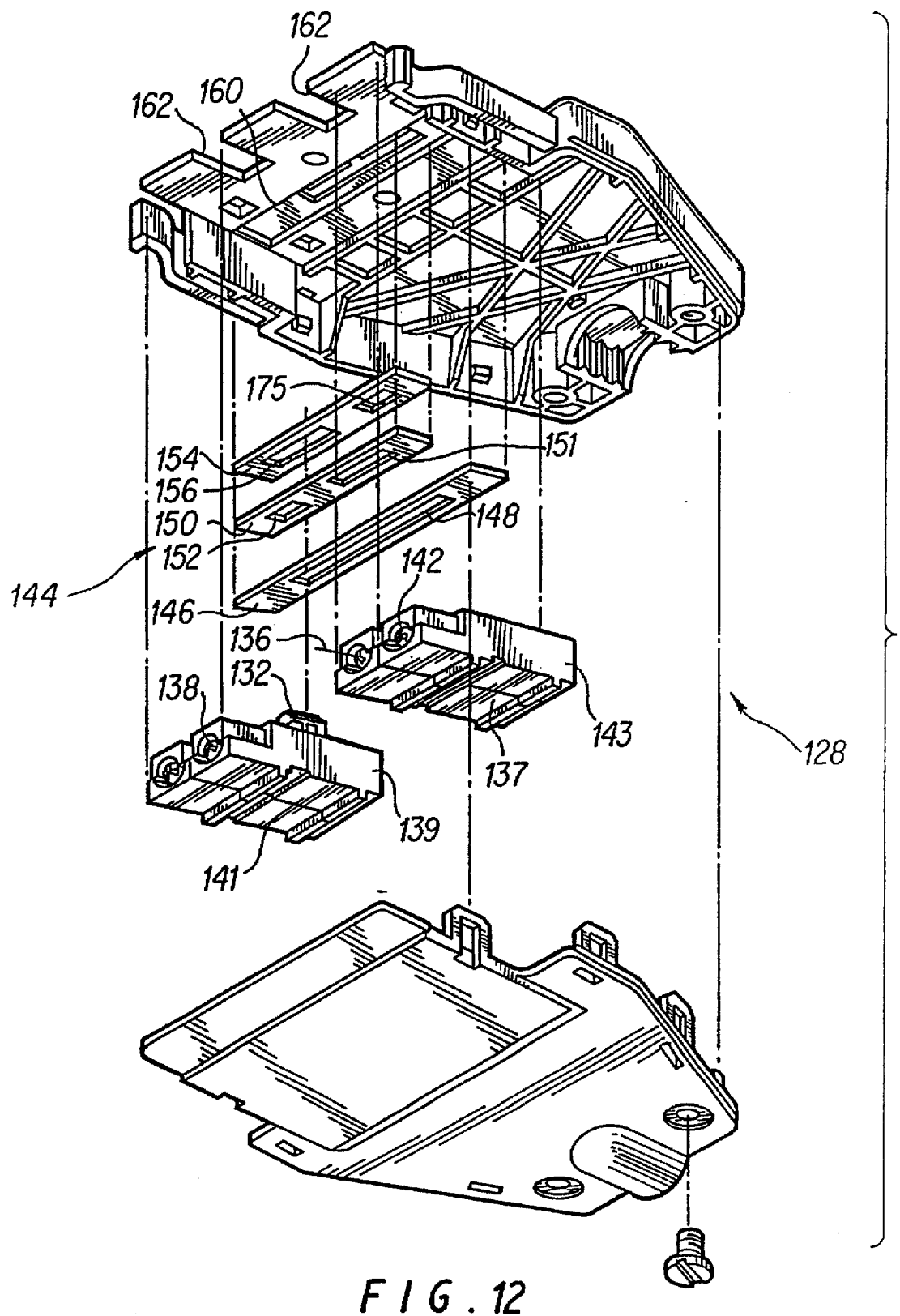

Referring now to FIGS. 10 through 12, a second embodiment of the invention can be seen to comprise a selector plug 128. As can be seen in the drawings, the selector plug 128 is provided with two thumbslide elements which are respectively numbered 130 and 132. As noted by the indicia 134 formed on the exterior of the plug 128, the appropriate positions of the elements 130, 132 are 1-2, 1-3, or 2-3. The thumbslide elements 130 and 132 respectively move pin contacts 136 and 138 which are carried by movable contact housings 137 and 139 respectively. The thumbslide element 130 forms a portion of the contact housing 137 and the thumbslide element 132 forms a portion of the contact housing 139. Accordingly, both of the pin contacts 136 and 138 can be positioned as desired to provide the proper wiring configuration in an associated lighting fixture. The selector plug 128 is useful with special industrial voltages which are three-phase industrial voltages such as 208, 220, 240 and 480. In the selector plug 128, a neutral pin contact 142 is carried by contact housing 143, whereas contact housing 141 does not house a pin contact. These contact housings 141 and 143 are stationary and are positioned essentially identically to the corresponding structure of the selector plug 40. The contact housing 141 is employed for supporting purposes only and fills that space which would normally carry a ground pin contact such as is used in the plug 40. In the plug 128, a ground pin contact is not used so the housing 141 does not provide a "housing" function but is shaped appropriately to fit into that space which it occupies. The remaining structure of the selector plug 128 is substantially identical to that of the selector plug 40 with the exception of selector mechanism 144 which is seen in the drawings to have a support plate 146 which is essentially identical to the plate 96. In this embodiment of the invention, the plate 146 is optional. However, for purposes of illustration, the plate 146 will be described. The support plate 146 has an aperture 148 formed therein which is essentially the same size and accomplishes the same function as the rectangular aperture 98 formed in the plate 96 as previously described. An interior plate 150 of the selector mechanism 144 is provided with apertures 151 and 152, the aperture 151 being larger. The plate 150 has a length of 1.210 inches and a width of 0.395 inch. The aperture 151 has a "length" of 0.350 inch and a "width" of 0.200 inch. The aperture 151 is spaced 0.155 inch from one end of the plate 150 and 0.705 inch from the other end of said plate 150. The aperture 152 has a "length" of 0.190 inch and a "width" of 0.200 inch. The aperture 152 is spaced 0.705 inch from one end of the plate 150 and 0.315 inch from the other end of the plate 150. The interior plate 150 functions similarly to the interior plate 100 of the plug 40.

A third plate 154 is provided having apertures 156 and 157 formed therein, the aperture 156 being larger. The third plate 154 is identical to the plate 150 with the apertures 156 and 157 being respectively identical to the apertures 151 and 152. However, the plate 154 is rotated 180° relative to the position of the plate 150 within the structure of the selector mechanism 144. The plates 150 and 154 can function without the need for the plate 146 which basically provides a covering function.

In the selector mechanism 144, the thumbslide element 130 is received through apertures 148, 151 and 157 in the plates 146, 150 and 154. The thumbslide element 132 is received within the apertures 148, 152 and 156 in the plates 146, 150 and 154. Given the relationship of the plates 146, 150 and 154 as well as of the apertures 148, 151, 152, 156 and 157, the two thumbslide elements 130 and 132 can be moved between the positions shown while maintaining a continuous facade across recess 160 formed in the plug 128, the recess 160 being substantially identical to and having the identical function to the recess 88 of the selector plug 40.

Since the plug 128 is intended for use with special industrial voltages which are not used together on a given job site, the size and positions of cut-outs 162 are chosen to be the same for the plug 128 regardless of the system voltage for the system within which the plug 128 is to be used. Therefore, the cut-outs 162 mate with correspondingly located crimps (not shown) formed about a port such as the port 38 of the connector 30 of the system 10.

As has been discussed relative to the selector plug 40 and the associated selector mechanism 46, the selector mechanism 144 can be configured other than has been described herein while maintaining the intended function. Further, the plugs 40 and 128 can be chosen to be shaped differently than as is shown as can the several contact housings. A primary capability of the present structures is the ability to be plugged together, the selector plugs 40 and 128 being receivable, for example, into an appropriate port such as the port 38 of the connector housing 34. Still further, it is to be understood that various voltages, amp ratings, etc. can be embodied in systems such as the industrial lighting system 10 as shown. The structure illustrated, for example, would generally be rated for use on 20 amp branch circuits. As another example, the flexible cord 42 would typically be number 16 AWG wire covered with insulation material which would be rated for at least 600 volts. However, the components of the system 10 can be otherwise configured and rated for use in various systems wherein loads which are to be energized differ.

Accordingly, the descriptions given herein of preferred embodiments of the invention are intended for illustration only and do not limit the scope of the invention as is recited in the appended claims.

What is claimed is:

1. An electrical circuit selection connector having a selection port capable of mating connection with a tapping port formed in an electrical cable-bearing connector disposed in an electrical system, the tapping port of the cable-bearing connector allowing electrical connection to any one circuit formed by any one electrically conductive cable of a plurality of cables carried by said cable-bearing connector, the circuit selection connector having more than one electrical conductor including a hot leg conductor wired to a lighting fixture or other electrical load in a predetermined manner such as for a given voltage to be imposed across said fixture for operation of the fixture, the tapping port of the cable-bearing electrical connector having positionally fixed contacts at least certain of which contacts electrically connect one each with one each of the cables and which mate selectively with the hot leg conductor of the selection connector, contacts of the selection port terminating the electrical conductors, the contact of the selection port terminating the hot leg conductor being displaceable positionally within the selection port by manual manipulation from exteriorly of the selection connector to locations of the selection port allowing alignment with and electrical connection to certain of the contacts of the tapping port which connect one each with one each of the cables, such selectable connection acting to place the fixture in a desired circuit formed by one of said cables carried by the cable-bearing electrical connector so as to operate the fixture at a desired voltage, the selection connector comprising selector means for positionally displacing the contact of the selection port terminating the hot leg conductor, the hot leg conductor terminating contact being slidable by manipulation of the selector means from exteriorly of the selection connector so that said contact is positioned to mate with a selected one of the contacts of the tapping port which connect one each with one each of the cables, a first portion of the selector means extending externally of the circuit selection connector for manual manipulation of the selector means from exteriorly of the selection connector and a second portion of the selector means being disposed interiorly of the circuit selection connector for engagement with the hot leg conductor terminating contact, the first and second portions of the selector means being joined to each other to allow positional displacement of the hot leg conductor terminating contact on manual manipulation of the first portion of the selector means, movement of the hot leg conductor terminating contact to a desired location of the selection port being thus facilitated at an installation site without resort to entry into the fixture to alter fixture wiring or entry into the selection connector, thereby to facilitate placement of the fixture in the appropriate electrical condition to cause said fixture to be part of a predetermined circuit formed with one of said cables in the cable-bearing electrical connector to which the circuit selection connector is electrically connected through the respective contacts of the selection port and of the tapping port.

2. The circuit selection connector of claim 1 wherein the hot leg conductor terminating contact is mounted by a contact housing, the contact housing being positionally displaceable by the selector means.

3. The circuit selection connector of claim 1 wherein the first portion of the selector means comprises a thumbslide element.

4. The circuit selection connector of claim 1 and further comprising covering means carried by the circuit selection connector and actuable by the selector means for preventing creation of an opening into the interior of the circuit selection connector on actuation of the selector means.

5. The electrical circuit selection connector of claim 1 and further comprising first keying means carried by the circuit selection connector and associated with the selection port and second keying means carried by the cable-bearing connector and associated with the tapping port for preventing mating of the ports together in the event that the contacts of the selection port are located in the selection port in positions incapable of completing an appropriate circuit with contacts of the tapping port.

6. The circuit selection connector of claim 1 wherein the cable-bearing electrical connector carries at least two electrically conductive cables, each of the cables forming a part of a separate electrical circuit and each of the cables connecting to one of the contacts of the tapping port, the selection port having at least two contacts one each terminating each of at least two hot leg conductors carried by the circuit selection connector, the hot leg conductor terminating contacts being positionally displaceable within the selection port and being capable of electrical connection with any one of the cables through mating connection with that contact of the tapping port which is electrically connected to said one of the cables.

7. The circuit selection connector of claim 6 wherein each of the hot leg conductor terminating contacts are mounted by a contact housing, each of the contact housings being positionally displaceable by the selector means.

8. The circuit selection connector of claim 6 wherein the selector means comprises at least two separately manipulatable selector elements, each selector element having a first portion extending externally of the circuit selection connector for manual manipulation of the selector element from exteriorly of the selection connector and a second portion disposed interiorly of the circuit selection connector for engagement with one of the hot leg conductor terminating contacts, the first and second portions of each selector element being joined to each other to allow positional displacement of the hot leg conductor terminating contact on manual manipulation of the first portion of the selector means.

9. The circuit selection connector of claim 8 wherein the first portion of at least one of the selector elements comprises a thumbslide element.

10. The circuit selection connector of claim 6 and further comprising covering means carried by the circuit selection connector and actuable by the selector means for preventing creation of an opening into the interior of the circuit selection connector on actuation of the selector means.

11. The electrical circuit selection connector of claim 6 wherein the circuit selection connector comprises a connector housing having a first housing portion and a second housing portion, the first housing portion having a perimetric body wall extending about at least major portions of the perimeter of the first housing portion, the body wall extending into mating contact with perimetric portions of the second housing portion to form said connector housing, the first and second housing portions being spaced apart when disposed in mating relationship, the circuit selection connector further comprising cooperating means carried by the housing portions for connecting said housing portions together, said cooperating means comprising a plurality of snap-fit connectors, certain ones of which snap-fit connectors being disposed about the periphery of the connector housing internally of said housing when the housing is assembled by mating of the first and second housing portions and certain others of the snap-fit connectors being disposed about the periphery of the connector housing externally of said housing, the snap-fit connections providing positive interconnection between the first and second housing portions of the connector housing.

12. The electrical circuit selection connector of claim 11 wherein each snap-fit connector comprises a U-shaped snap-fit element formed on and extending above a facing surface of one of the housing portions, bight portions of each U-shaped snap-fit element being spaced from said facing surface, each snap-fit connector further comprising a nub element formed on the other housing portion and located thereon to snap into the U-shaped snap-fit element and to bias against the bight portion of said snap-fit element on mating assembly of the first and second housing portions.

13. The electrical circuit selection connector of claim 12 wherein the snap-fit elements are formed on the second housing portion and the nub elements are formed on the body wall of the first housing portion, certain of the snap-fit elements being located adjacent to and spaced from the perimetric edges of said second housing portion and certain others of the snap-fit elements being located on the perimetric edges of said second housing portion, certain of the nub elements being located on inner surfaces of the body wall to mate with those snap-fit elements located adjacent to and spaced from the perimetric edges of the second housing portion and certain others of the nub elements being located on outer surfaces of the body wall to mate with those snap-fit elements located on the perimetric edges of the second housing portion.

14. The electrical circuit selection connector of claim 1 wherein the contacts of the selection port comprise pin contacts and wherein the contacts of the tapping port comprise socket contacts.

15. The circuit selection connector of claim 14 wherein the cable-bearing electrical connector carries at least two electrically conductive cables, each of the cables forming a part of a separate electrical circuit and each of the cables connecting to one of the socket contacts of the tapping port, the pin contact of the selection port which is positionally displaceable within the selection port being capable of electrical connection with any one of the cables through mating connection with that socket contact electrically connected to said one of the cables.

16. The circuit selection connector of claim 15 wherein a plurality of the pin contacts are disposed within the selection port, one of the pin contacts being the hot leg conductor terminating contact and being positionally displaceable within the selection port and another one of the pin contacts of the selection port being connected to a ground conductor of the fixture and being matable with a ground conductor wired to one of the socket contacts of the tapping port of the cable bearing connector, thereby providing a ground leg.

17. The circuit selection connector of claim 16 wherein one of the pin contacts of the selection port is a neutral leg and is matable with a neutral socket contact of the tapping port of the cable bearing connector.

18. The circuit selection connector of claim 17 wherein the ground and neutral legs are positionally fixed within the selection port of the circuit selection connector.

19. The circuit selection connector of claim 18 wherein the ground leg is fixed at one side of the selection port and the neutral leg is fixed at the opposite side of the selection port, the hot leg conductor terminating contact being positionally displaceable between said ground and neutral legs.

20. The circuit selection connector of claim 1 wherein the hot leg conductor terminating contact is mounted by a contact housing, the contact housing being positionally displaceable by the selector means and further comprising guide means for maintaining the contact housing in a predetermined relation to the selection port, the guide means comprising track elements formed on interior walls of the circuit selection connector and track following elements formed on the contact housing, the track following elements moving along the track elements on displacement of the contact housing to positively maintain the contact housing in predetermined locations during movement and in a predetermined position for mating engagement with a contact of the tapping port when moved to a desired resting location.

21. The circuit selection connector of claim 20 wherein the selector means comprise a thumbslide element located exteriorly of the circuit selection connector, the thumbslide element being directly connected to the contact housing carrying the hot leg conductor terminating contact for positive engagement with said contact housing such that manual manipulation of the thumbslide element positionally displaces the contact housing and thus the hot leg conductor terminating contact to locate said housing and hot leg conductor terminating contact carried thereby for electrical connection to a predetermined contact of the tapping port on mating of the selection port with the tapping port, the contact housing being disposed interiorly of the circuit selection connector.

22. The circuit selection connector of claim 6 wherein each hot leg conductor terminating contact is mounted by a contact housing, each contact housing being positionally displaceable by the selector means, and further comprising guide means for maintaining each contact housing in a predetermined relation to the selection port, the guide means comprising track elements formed on interior walls of the circuit selection connector and track following elements formed on each contact housing, the track following elements moving along the track elements on displacement of the contact housing to positively maintain the contact housing in predetermined locations during movement and in predetermined positions for mating engagement with contacts of the tapping port when moved to desired resting locations.

23. The circuit selection connector of claim 22 wherein the selector means comprise at least one thumbslide element located exteriorly of the circuit selection connector, each one of the thumbslide elements being directly connected to one of the contact housings carrying one of the hot leg conductor terminating contacts for positive engagement with said contact housing such that manual manipulation of each thumbslide element positionally displaces the contact housing connected thereto and thus the hot leg conductor terminating contact carried by the contact housing to locate said housing and the hot leg conductor terminating contact for electrical connection to a predetermined contact of the tapping port on mating of the selection port with the tapping port, the contact housings being disposed interiorly of the circuit selection connector.

24. The electrical circuit selection connector of claim 1 wherein the circuit selection connector comprises a connector housing having a first housing portion and a second housing portion, the first housing portion having a perimetric body wall extending about at least major portions of the first housing portion, the body wall extending into mating contact with perimetric portions of the second housing portion to form said connector housing, the first and second housing portions being spaced apart when disposed in mating relationship, the circuit selection connector further comprising cooperating means carried by the housing portions for connecting said housing portions together, said cooperating means comprising a plurality of snap-fit connectors, certain ones of said snap-fit connectors being disposed about the periphery of the connector housing internally of said housing when the housing is assembled by mating of the first and second housing portions and certain others of the snap-fit connectors being disposed about the periphery of the connector housing externally of said housing, the snap-fit connections providing positive interconnection between the first and second housing portions of the connector housing.

25. The electrical circuit selection connector of claim 24 wherein each snap-fit connector comprises a U-shaped snap-fit element formed on and extending above a facing surface of one of the housing portions, bight portions of each U-shaped snap-fit element being spaced from said facing surface, each snap-fit connector further comprising a nub element formed on the other housing portion and located thereon to snap into the U-shaped snap-fit element and to bias against the bight portion of said snap-fit element on mating assembly of the first and second housing portions.

26. The electrical circuit selection connector of claim 25 wherein the snap-fit elements are formed on the second housing portion and the nub elements are formed on the body wall of the first housing portion, certain of the snap-fit elements being located adjacent to and spaced from the perimetric edges of said second housing portion and certain others of the snap-fit elements being located on the perimetric edges of said second housing portion, certain of the nub elements being located on inner surfaces of the body wall to mate with those snap-fit elements located adjacent to and spaced from the perimetric edges of the second housing portion and certain others of the nub elements being located on outer surfaces of the body wall to mate with those snap-fit elements located on the perimetric edges of the second housing portion.

27. An electrical connector capable of being connected to an electrical circuit, the connector comprising:
- a connector housing having a first housing portion and a second housing portion, the first housing portion having a perimetric body wall extending about at least major portions of the perimeter of the first housing portion, the body wall extending into mating contact with perimetric portions of the second housing portion to form said connector housing, the first and second housing portions being spaced apart when disposed in mating relationship;
- a plurality of electrical contacts mounted within the connector housing, at least one of the electrical contacts comprising a hot leg and being positionally displaceable within the connector housing to at least one location capable of electrical connection to the electrical circuit by contact with a desired portion of the electrical circuit;
- selector means carried by the connector housing and connected to said at least one of the electrical contacts for moving said at least one of the electrical contacts to said at least one location within the connector housing; and,
- cooperating means carried by the housing portions for connecting said housing portions together, said cooperating means comprising a plurality of snap-fit connectors, certain ones of said snap-fit connectors being disposed about the periphery of the connector housing internally of said housing when the housing is assembled by mating of the first and second housing portions and certain others of the snap-fit connectors being disposed about the periphery of the connector housing externally of said housing, each snap-fit connector comprising a U-shaped snap-fit element formed on and extending above a facing surface of one of the housing portions, bight portions of each U-shaped snap-fit element being spaced from said facing surface, the snap-fit connectors providing positive interconnection between the first and second housing portions of the connector housing.

28. The electrical connector of claim 27 wherein each said snap-fit connector further comprises a nub element formed on the other housing portion and located thereon to snap into the U-shaped snap-fit element and to bias against the bight portion of said snap-fit element on mating assembly of the first and second housing portions.

29. The electrical connector of claim 28 wherein the snap-fit elements are formed on the second housing portion and the nub elements are formed on the body wall of the first housing portion, certain of the snap-fit elements being located adjacent to and spaced from the perimetric edges of said second housing portion and certain others of the snap-fit elements being located on the perimetric edges of said second housing portion, certain of the nub elements being located on inner surfaces of the body wall to mate with those snap-fit elements located adjacent to and spaced from the perimetric edges of the second housing portion and certain others of the hub elements being located on outer surfaces of the body wall to mate with those snap-fit elements located on the perimetric edges of the second housing portion.

30. The electrical connector of claim 29 wherein the second housing portion is formed with a slot adjacent to each of the snap-fit elements disposed interiorly of the connector housing, the slots allowing communication into the interior of the connector housing to enable the nub element to be disengaged from the snap-fit element through use of an appropriate tool.

31. The electrical connector of claim 30 wherein the second housing portion is formed with cut-out portions spaced oppositely to the bight portions of each of the snap-fit elements disposed exteriorly of the connector housing, thereby to facilitate disengagement of the nub element from the snap-fit element.

32. The electrical connector of claim 27 and further comprising covering means carried by the connector housing and actuable by the selector means for preventing creation of an opening into the interior of the connector housing on actuation of the selector means.

33. The electrical connector of claim 32 wherein the connector housing has an opening formed therein in a location adjacent to at least portions of the at least one of the electrical contacts disposed within the connector housing, a first portion of the selector means extending into the connector housing and being adapted to move the at least one of the electrical contacts disposed within the connector housing and a second portion of the selector means extending through the opening and being disposed exteriorly of the connector housing to move the at least one of the electrical contacts to at least one of the locations within the connector housing on manual manipulation of said second portion, whereby electrical connection to a desired electrical circuit can be accomplished.

34. The electrical connector of claim 33 and further comprising a contact housing mounting the at least one of the electrical contacts, means for mounting the contact housing for movement within the connector housing between predetermined positions therein, the second portion of the selector means comprising a thumbslide element and the first portion of the selector means being fixed to the contact housing.

35. The electrical connector of claim 34 wherein an anterior wall of the connector housing has a recess formed therein, the opening being at least partially located within the confines of the recess, the recess having wall elements defining the recess, the covering means comprising a first plate member disposed substantially within the recess and having an aperture formed substantially centrally therein, a second plate member disposed within the recess between the first plate member and the interior wall of the connector housing within which the recess is formed and having an aperture formed substantially centrally therein, and a third plate member disposed between the first and second plate members and having an aperture formed substantially centrally therein, portions of the selector means extending between the thumbslide and the second portion of the selector means extending through the apertures in the first, second and third plate members, the second and third plate members being each movable along at least portions of that distance travelled by the thumbslide and contact housing on movement of the thumbslide to position the contact housing and the contact carried thereby at a desired location within the connector housing, the plate members acting to cover the opening to prevent access into the interior of the connector housing at all positions of the thumbslide.

36. The electrical connector of claim 35 wherein the opening, the recess, the first, second and third plates and the apertures respectively formed in the plates are rectangular in conformation, the opening being disposed within the recess centrally of the length of the recess and having a leading edge continguous with a portion of a leading edge of the recess, the width of the recess being greater than the width of the opening, the first plate member fitting into the recess and being stationary therein, the apertures respectively formed in the plate members being of a similar width which is less than the width of the opening and of a width slightly greater than the dimension of those portions of the selector means which respectively extend through the apertures formed in the plate members, the second plate member having a length substantially equal to the combined length of the aperture formed in the first plate member and one solid end portion of the first plate member, the third plate member having a length less than half the length of the first plate member, the aperture formed in the third plate member having a length substantially equal to the width of the aperture formed in the first plate member, the width of the aperture formed in the third plate member being sufficiently dimensioned to flushly receive that portion of the selector means extending therethrough, the relationship of the plate members and the apertures respectively formed therein acting to cover the opening without a discontinuity forming between the plate members on full travel of the thumbslide over the opening.

37. The electrical connector of claim 36 and further comprising at least two contact housings each mounting one of the electrical contacts, the connector housing having an opening formed therein in a location adjacent to the contact housings, means for mounting each of the contact housings for movement within the connector housing between predetermined positions therein, the selector means comprising two elongated body elements one each being connected to one each of the connector housings at one end of each said body element, each body element extending through the opening and terminating in a thumbslide, each thumbslide being manually manipulatable to move the contact housing joined thereto between predetermined positions within the connector housing, whereby electrical connection to a desired electrical circuit can be accomplished.

38. The electrical connector of claim 37 wherein an interior wall of the connector housing has a recess formed therein, the opening being at least partially located within the confines of the recess, the recess having wall elements defining the recess, the covering means comprising a first plate member having first and second apertures formed therein and being received within the recess, the first aperture having a dimension in the direction of a major axis of the recess which is greater than the corresponding dimension of the second aperture, a second plate member disposed between the first plate member and the interior wall and having first and second apertures formed therein, the second aperture having a dimension in the direction of a major axis of the recess which is greater than the corresponding dimension of the first aperture, the first aperture of the first body member having a length greater than the corresponding dimension of the first aperture of the second body member and the second aperture of the second body member having a length greater than the corresponding dimension of the second aperture of the second body member, the plate members being positioned relative to each other such that the first apertures of the plate members align and the second apertures of the plate members align, respective body elements of the selector means extending through the respectively aligned apertures of the plate members, the first and second plate members being each movable along at least portions of the distances travelled by each thumbslide and associated contact housing on movement of each thumbslide to position the associated contact housing and the contact carried thereby at desired locations within the connector housing, the plate members acting to cover the opening to prevent access into the interior of the connector housing at all positions of the thumbslide.

39. The electrical connector of claim 28 wherein the second housing portion is formed with a slot adjacent to each of the snap-fit elements disposed interiorly of the connector housing, the slots allowing communication into the interior of the connector housing to enable the nub element to be disengaged from the snap-fit element through use of an appropriate tool.

40. The electrical connector of claim 39 wherein the second housing portion is formed with cut-out portions spaced oppositely to the bight portions of each of the snap-fit elements disposed exteriorly of the connector housing, thereby to facilitate disengagement of the nub element from the sanp-fit element.

41. An electrical connector capable of being connected to an electrical circuit, the connector comprising:
  a connector housing having a recess formed therein;
  a plurality of electrical contacts mounted within the connector housing, at least one of the electrical contacts comprising a hot leg and being positionally displaceable within the connector housing to at least one location capable of electrical connection to the electrical circuit by contact with a desired portion of the electrical circuit;
  selector means carried by the connector housing and connected to said at least one of the electrical contacts for moving said at least one of the electrical contacts to said at least one location within the connector housing; and,
  plate means carried by the connector housing and actuable by the selector means for preventing communication into the interior of the connector housing on actuation of the selector means, the plate means being disposed substantially within the recess and being movably connected to the selector means for movement on actuation of the selector means to prevent communication into the interior of the connector housing.

42. The electrical connector of claim 41 wherein the connector housing has an opening formed therein in a location adjacent to at least portions of the at least one of the electrical contacts disposed within the connector housing, a first portion of the selector means extending into the connector housing and being adapted to move the at least one of the electrical contacts disposed within the connector housing and a second portion of the selector means extending through the opening and being disposed exteriorly of the connector housing to move the at least one of the electrical contacts to the at least one of the locations within the connector housing on manual manipulation of said second portion, whereby electrical connection to a desired electrical circuit can be accomplished.

43. The electrical connector of claim 42 and further comprising a contact housing mounting the at least one of the electrical contacts, means for mounting the contact housing for movement within the connector housing between predetermined positions therein, the second portion of the selector means comprising a thumbslide element and the first portion of the selector means being fixed to the contact housing.

44. The electrical connector of claim 43 wherein the contact housing and the first and second portions of the selector means are formed integrally whereby manual manipulation of the thumbslide positively displaces the contact housing and the contact carried thereby to a predetermined position within the connector housing.

45. The electrical connector of claim 43 wherein an interior wall of the connector housing has the recess formed therein, the opening being at least partially located within the confines of the recess, the recess having wall elements defining the recess, the covering means comprising a first plate member disposed substantially within the recess and having an aperture formed substantially centrally therein, a second plate member disposed within the recess between the first plate member and the interior wall of the connector housing within which the recess is formed and having an aperture formed substantially centrally therein, and a third plate member disposed between the first and second plate members and having an aperture formed substantially centrally therein, portions of the selector means extending between the thumbslide and the second portion of the selector means extending through the apertures in the first, second and third plate members, the second and third plate members being each movable along at least portions of that distance travelled by the thumbslide and contact housing on movement of the thumbslide to position the contact housing and the contact carried thereby at a desired location within the connector housing, the plate members acting to cover the opening to prevent access into the interior of the connector housing at all positions of the thumbslide.

46. The electrical connector of claim 45 wherein the opening, the recess, the first, second and third plate members and the apertures respectively formed in the plate members are rectangular in conformation, the opening being disposed within the recess centrally of the length of the recess and having a leading edge contiguous with a portion of a leading edge of the recess, the width of the recess being greater than the width of the opening, the first plate member fitting into the recess and being stationary therein, the apertures respectively formed in the plate members being of a similar width which is less than the width of the opening and of a width greater than the dimension of those portions of the selector means which respectively extend through the apertures formed in the plate members, the second plate member having a length substantially equal to the combined length of the aperture formed in the first plate member and one solid end portion of the first plate member, the third plate member having a length less than half the length of the first plate member, the aperture formed in the third plate member having a length substantially equal to the width of the aperture formed in the first plate member, the width of the aperture formed in the third plate member being sufficiently dimensioned to flushly receive that portion of the selector means extending therethrough, the relationship of the plate members and of the apertures respectively formed therein acting to cover the opening without a discontinuity forming between the plate members on full travel of the thumbslide over the opening.

47. The electrical connector of claim 42 wherein an interior wall of the connector housing has a recess formed therein, the opening being at least partially located within the confines of the recess, the recess having wall elements defining the recess, the covering means comprising a first plate member disposed substantially within the recess and having an aperture formed substantially centrally therein, a second plate member disposed within the recess between the first plate member and the interior wall of the connector housing within which the recess is formed and having an aperture formed substantially centrally therein, and a third plate member disposed between the first and second plate members and having an aperture formed substantially centrally therein, portions of the selector means extending between the thumbslide and the second portion of the selector means extending through the apertures in the first, second and third plate members, the second and third plate members being each movable along at least portions of that distance travelled by the thumbslide and the electrical contact on movement of the thumbslide to position the electrical contact carried thereby at a desired location within the connector housing, the plate members acting to prevent access into the interior of the connector housing at all positions of the thumbslide.

48. The electrical connector of claim 47 wherein the opening, the recess, the first, second and third plate members and the apertures respectively formed in the plate members are rectangular in conformation, the opening being disposed within the recess centrally of the length of the recess and having a leading edge continguous with a portion of a leading edge of the recess, the width of the recess being greater than the width of the opening, the first plate member fitting into the recess and being stationary therein, the apertures respectively formed in the plate members being of a similar width which is less than the width of the opening and of a width greater than the dimension of those portions of the selector means which respectively extend through the apertures formed in the plate members, the second plate member having a length substantially equal to the combined length of the aperture formed in the first plate member and one solid end portion of the first plate member, the third plate member having a length less than half the length of the first plate member, the aperture formed in the third plate member having a length substantially equal to the width of the aperture formed in the first plate member, the width of the aperture formed in the third plate member being sufficiently dimensioned to flushly receive that portion of the selector means extending therethrough, the relationship of the plate members and of the apertures respectively formed therein acting to cover the opening without a discontinuity forming between the plate members on full travel of the thumbslide over the opening.

49. An electrical connector capable of being connected to an electrical circuit, the connector comprising:
   a connector housing;
   a plurality of electrical contacts mounted within the connector housing, at least one of the electrical contacts comprising a hot leg and being positionally displaceable within the connector housing to at least one location capable of electrical connection to the electrical circuit by contact with a desired portion of the electrical circuit;
   selector means carried by the connector housing and connected to said at least one of the electrical contacts for moving said at least one of the electrical contacts to said at least one location within the connector housing;

covering means carried by the connector housing and actuable by the selector means for preventing communication into the interior of the connector housing on actuation of the selector means; and, at least two contact housings each mounting one of the electrical contacts, the connector housing having an opening formed therein in a location adjacent to the contact housings; means for mounting each of the contact housings for movement within the connector housing between predetermined positions therein, the selector means comprising two elongated body elements one each being connected to one each of the contact housings at one end of each said body element, each body element extending through the opening and terminating in a thumbslide, each thumbslide being manually manipulatable to move the contact housing joined thereto between predetermined positions within the connector housing, whereby electrical connection to a desired electrical circuit can be accomplished.

50. The electrical connector of claim 49 wherein an interior wall of the connector housing has a recess formed therein, the opening being at least partially located within the confines of the recess, the recess having wall elements defining the recess, the covering means comprising a first plate member having first and second apertures formed therein and being received within the recess, the first aperture having a dimension in the direction of a major axis of the recess which is greater than the corresponding dimension of the second aperture, a second plate member disposed between the first plate member and the interior wall and having first and second apertures formed therein, the second aperture having a dimension in the direction of a major axis of the recess which is greater than the corresponding dimension of the first aperture, the first aperture of the first body member having a length greater than the corresponding dimension of the first aperture of the second body member and the second aperture of the second body member having a length greater than the corresponding dimension of the second aperture of the second body member, the plate members being positioned relative to each other such that the first apertures of the plate members align and the second apertures of the plate members align, respective body elements of the selector means extending through the respectively aligned apertures of the plate members, the first and second plate members being each movable along at least portions of the distances travelled by each thumbslide and associated contact housing on movement of each thumbslide to position the associated contact housing and the contact carried thereby at desired locations within the connector housing, the plate member acting to cover the opening to prevent access into the interior of the connector housing at all positions of the thumbslides.

51. An electrical connector capable of being connected to an electrical circuit, the connector comprising:

a connector housing having a first housing portion and a second housing portion, the first housing portion having a perimetric body wall extending about at least major portions of the perimeter of the first housing portion, the body wall extending into mating contact with perimetric portions of the second housing portion to form said connector housing, the first and second housing portions being spaced apart when disposed in mating relationship;

a plurality of electrical contacts mounted within the connector housing, at least one of the electrical contacts comprising a hot leg and being positionally displaceable within the connector housing to at least one location capable of electrical connection to the electrical circuit by contact with a desired portion of the electrical circuits; and, cooperating means carried by the housing portions for connecting said housing portions together, said cooperating means comprising a plurality of snap-fit connectors, certain ones of said snap-fit connectors being disposed about the periphery of the connector housing internally of said housing when the housing is assembled by mating of the first and second housing portions and certain others of the snap-fit connectors being disposed about the periphery of the connector housing externally of said housing, each snap-fit connector comprising a U-shaped snap-fit element formed on and extending above a facing surface of one of the housing portions, bright portions of each U-shaped snap-fit element being spaced from said facing surface, the snap-fit connectors providing positive interconnection between the first and the second housing portions of the connector housing.

52. The electrical connector of claim 51 wherein each snap-fit connector further comprises a nub element formed on the other housing portion and located thereon to snap into the U-shaped snap-fit element and to bias against the bight portion of the said snap-fit element on mating assembly of the first and second housing portions.

53. The electrical connector of claim 52 wherein the second housing portion is formed with a slot adjacent to each of the snap-fit elements disposed interiorly of the connector housing, the slots allowing communication into the interior of the connector housing to enable the nub element to be disengaged from the snap-fit element through use of an appropriate tool.

54. The electrical connector of claim 53 wherein the second housing portion is formed with cut-out portions spaced oppositely to the bight portions of each of the snap-fit elements disposed exteriorly of the connector housing, thereby to facilitate disengagement of the nub element with the snap-fit element.

55. The electrical connector of claim 53 wherein the snap-fit elements are formed on the second housing portion and the nub elements are formed on the body wall of the first housing portion, certain of the snap-fit elements being located adjacent to and spaced from the perimetric edges of the second housing portion and certain others of the snap-fit elements being located on the perimetric edges of said second housing portion, certain of the nub elements being located on inner surfaces of the body wall to mate with those snap-fit elements located adjacent to and spaced from the perimetric edges of the second housing portion and certain others of the nub elements being located on outer surfaces of the body wall to mate with those snap-fit elements located on the perimetric edges of the second housing portion.

56. An electrical connector capable of being connected to an electrical circuit, the connector comprising:

a connector housing;

a plurality of electrical contacts mounted for movement interiorly within the connector housing, at least one of the electrical contacts being positionally displaceable within the connector housing to at least one location within the housing whereby the at least one electrical contact is capable of electrical connection to the electrical circuit by contact with a desired portion of the electrical circuit; and, selector means carried by the connector housing and connected to said at least one of the electrical contacts for moving said at least one of the electrical contacts to said at least one location within the connector housing, a first portion of the selector means extending externally of the housing for manual manipulation of the selector means from externally of the housing and a second portion of the selector means being disposed interiorly of the housing for engagement with the at least one of the electrical contacts, the first and second portions of the selector means being joined to each other to allow positional displacement of the at least one of the electrical contacts on manual manipulation of the first portion of the selector means.

57. An electrical connector capable of being connected to an electrical circuit, the connector comprising:

a connector housing having an interior wall with a recess formed therein;

a plurality of electrical contacts mounted within the connector housing, at least one of the electrical contacts comprising a hot leg and being positionally displaceable within the connector housing to at least one location capable of electrical connection to the electrical circuit by contact with a desired portion of the electrical circuit;

selector means carried by the connector housing and connected to said at least one of the electrical contacts for sliding said at least one of the electrical contacts to said at least one location within the connector housing; and, covering means carried by the connector housing and actuable by the selector means for preventing creation of an opening into the interior of the connector housing on actuation of the selector means, the covering means comprising a first plate member disposed substantially within the recess and having an aperture formed substantially centrally therein, a second plate member disposed within the recess between the first plate member and the interior wall of the connector housing within which the recess is formed and having an aperture formed substantially centrally therein, and a third plate member disposed between the first and second plate members and having an aperture formed substantially centrally therein, portions of the selector means extending through the apertures in the first, second and third plate members, the second and third plate members being each movable along at least portions of that distance traveled by the selector means on movement thereof to position said at least one of the electrical contacts at a desired location within the connector housing, the plate members acting to cover the opening to prevent access into the interior of the connector housing at all positions of the selector means.

* * * * *